United States Patent
Young et al.

(10) Patent No.: US 11,129,092 B2
(45) Date of Patent: Sep. 21, 2021

(54) APPLICATION SPECIFIC LOCATION DISCOVERY

(71) Applicant: Verizon Patent and Licensing Inc., Arlington, VA (US)

(72) Inventors: Kristen Sydney Young, Morris Plains, NJ (US); Kalyani Bogineni, Hillsborough, NJ (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/580,366

(22) Filed: Sep. 24, 2019

(65) Prior Publication Data

US 2021/0092673 A1 Mar. 25, 2021

(51) Int. Cl.
| | |
|---|---|
| *H04W 48/16* | (2009.01) |
| *H04W 4/029* | (2018.01) |
| *H04W 48/18* | (2009.01) |
| *H04W 64/00* | (2009.01) |
| *H04W 8/00* | (2009.01) |
| *H04W 4/021* | (2018.01) |

(52) U.S. Cl.
CPC ........... *H04W 48/16* (2013.01); *H04W 4/021* (2013.01); *H04W 4/029* (2018.02); *H04W 8/005* (2013.01); *H04W 48/18* (2013.01); *H04W 64/003* (2013.01)

(58) Field of Classification Search
CPC ......... H04W 36/0033; H04W 36/0061; H04W 4/12; H04W 48/17; H04W 48/18; H04W 8/082; H04W 8/18; H04W 80/04; H04W 84/045; H04W 88/06
See application file for complete search history.

(56) References Cited

U.S. PATENT DOCUMENTS

| | | | | |
|---|---|---|---|---|
| 9,351,234 | B2 * | 5/2016 | Ramle | H04W 48/20 |
| 2007/0053370 | A1 * | 3/2007 | Aghvami | H04W 8/18 370/401 |
| 2015/0024745 | A1 * | 1/2015 | Zhou | H04W 8/005 455/434 |
| 2016/0242110 | A1 * | 8/2016 | Kant | H04W 48/18 |
| 2017/0332421 | A1 * | 11/2017 | Sternberg | H04L 41/0896 |
| 2018/0262924 | A1 * | 9/2018 | Dao | H04W 72/1257 |
| 2018/0317163 | A1 * | 11/2018 | Lee | H04W 16/02 |
| 2019/0098569 | A1 * | 3/2019 | Hou | H04W 8/18 |

FOREIGN PATENT DOCUMENTS

| | | | | |
|---|---|---|---|---|
| WO | WO-2008132163 A1 * | 11/2008 | ............ | H04W 48/17 |
| WO | WO-2009150003 A1 * | 12/2009 | ............ | H04W 48/17 |
| WO | WO-2017079906 A1 * | 5/2017 | ............ | H04W 48/18 |

* cited by examiner

*Primary Examiner* — Matthew C Sams

(57) ABSTRACT

A system may determine an identifier associated with a location of a user device in response to receiving an indication that the user device has moved to the location and perform a first lookup to determine an application specific location associated with the identifier. A second lookup may be performed to determine one or more network functions available in the application specific location. An indication of the one or more network functions may be outputted.

20 Claims, 9 Drawing Sheets

Table A

| S-NSSAI | Cell ID | Application Location ID |
|---|---|---|
| S1 | C1, C2, C3 | A1 |
|  | C4, C5, C6 | A2 |
| S2 | C1, C2, C3, C5, C6 | A3 |

Table B

| S-NSSAI | TAI | Application Location ID |
|---|---|---|
| S1 | T1 | A4 |
|  | T2 | A5 |
| S2 | T3, T4 | A6 |

Table C

| S-NSSAI | Application Location ID | NF Instance ID |
|---|---|---|
| S1 | A1 | N1, N2, N3 |
|  | A2 | N10, N20 |
| S2 | A5 | N31, N32, N33 |

Table D

| NSI ID | Application Location ID | NF Instance ID |
|---|---|---|
| NS1 | A1 | N1, N2, N3 |
|  | A2 | N10, N20 |
| NS2 | A5 | N31, N32, N33 |

FIG. 5

APPLICATION SPECIFIC LOCATION DISCOVERY

BACKGROUND INFORMATION

In order to satisfy the needs and demands of users of mobile communication devices, providers of wireless communication services continue to improve and expand available services as well as networks used to deliver such services. In order to provide the best network services for a mobile communication device, it may be necessary to discover available network functions based on a location of the mobile communication device. Current network function location discovery boundaries may not be sufficient for some types of networks, such as low latency networks.

BRIEF DESCRIPTION OF THE DRAWINGS

FIG. 5 is a diagram illustrating exemplary tables for determining network functions according to an implementation described herein;

DETAILED DESCRIPTION OF PREFERRED EMBODIMENTS

Figure 1:
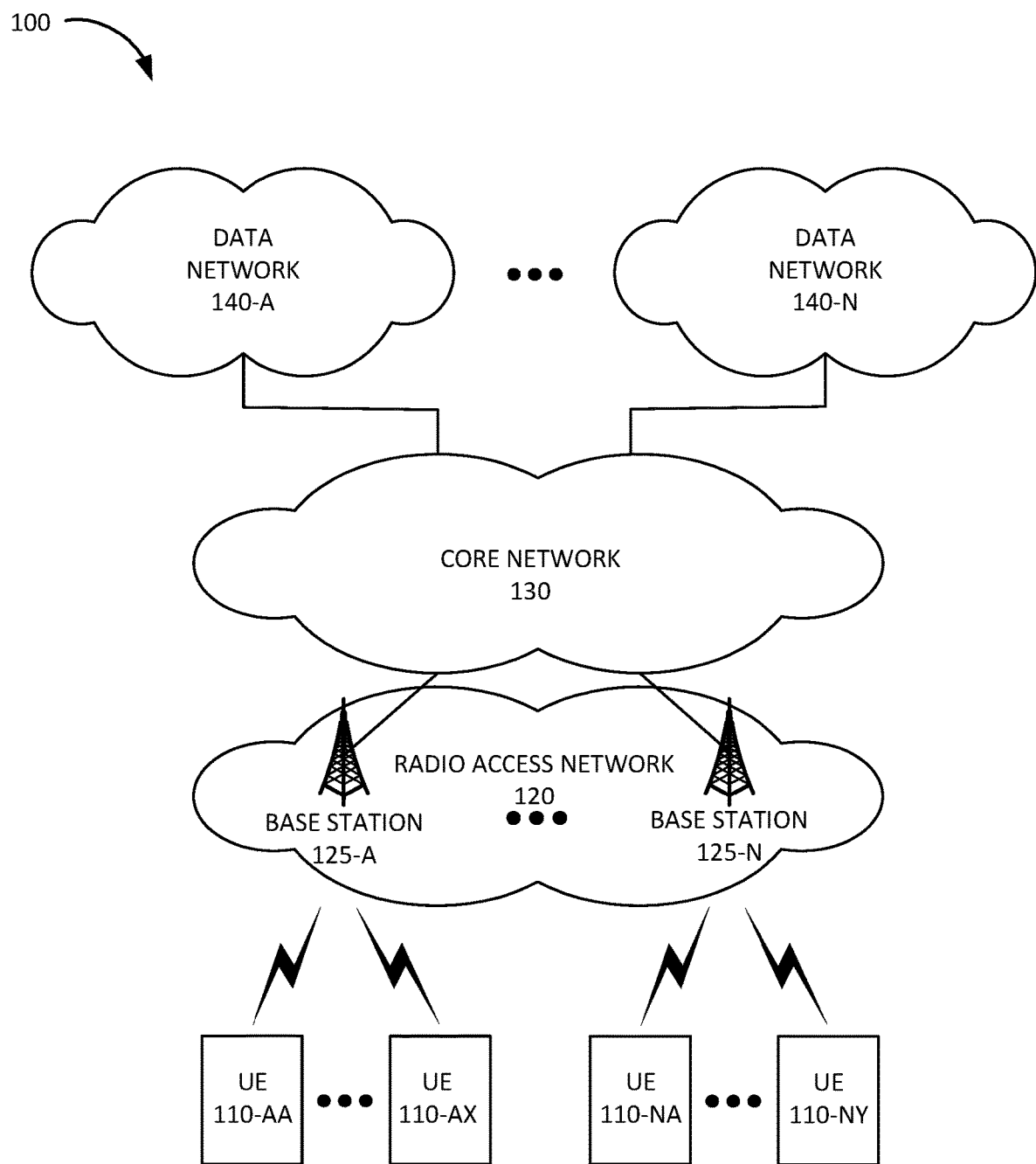
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks has become increasingly more complex. One way in which wireless access networks are continuing to become more complicated is by incorporating various aspects of next generation networks, such as fifth generation (5G) mobile networks, utilizing high frequency bands (e.g., 24 Gigahertz (GHz), 39 GHz, etc.), and/or lower frequency bands such as Sub 6 GHz, and a large number of antennas. 5G New Radio (NR) millimeter (mm) wave technology may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

Moreover, improvements in the core networks of 5G wireless access networks provide new functionality, such as, for example, network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular Quality of Service (QoS) class, type of service, and/or particular enterprise customer associated with a set of UE devices.

In order to implement functionality for UEs, a 5G core network may include various network nodes or elements, known as network functions (NFs). The discovery of NF instances suitable to handle a packet data unit (PDU) session of a UE is based on a number of criteria, such as single network slice selection assistance information (NSSAI), UE location, etc. There may be different types of location information for the purpose of the discovery of NF instances—track area identifiers (TAIs) and operator specific location information to name a few.

The use of TAIs may restrict all applications running on a UE to a single tracking area (TA) design of the underlying physical network instead of allowing different logical or virtual location definitions tailored to different applications. For example, a coverage area for an application associated with a multi-access edge computing (MEC) site may not be best defined by tracking areas defined in the underlying network. In addition, designing tracking areas based on MEC applications may not be ideal for other applications using the physical network.

In order to offer services to a UE from a location most suitable to an application being executed, the application may have its own location definitions. In this way, application specific locations may be defined. In addition, a UE location may be mapped to an application specific location in order to locate the network functions available in the location.

A Network Repository Function (NRF) may provide NF registration, management, discovery, and/or authentication services within the 5G core. For example, when a new NF is brought online, the new NF may register its reachability and services information with the NRF. In addition, the new NF may register its application specific location with the NRF so that a UE may be able to utilize services offered by the new NF when the UE is in the application specific location.

Implementations described herein relate to identifying network functions based on UE application specific locations. When a UE moves to a new location, it may not be possible to determine the best NF instance to serve the UE based on the tracking area associated with the new location. In these instances, an application specific location may be determined for the new location. Because the network functions register application specific locations with the NRF when the network functions are brought online, implementations described herein may determine the most appropriate network function to serve the UE at the new location based on the UE application specific location information.

FIG. 1 is a diagram of an exemplary environment 100 in which the systems and/or methods, described herein, may be implemented. As shown in FIG. 1, environment 100 may include user equipment (UE) devices 110-AA to 110-NY (referred to herein collectively as "UE devices 110" and individually as "UE device 110"), a radio access network (RAN) 120, a core network 130, and data networks 140-A to 140-N.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Radio access network 120 may enable UE devices 110 to connect to core network 130 for mobile telephone service, Short Message Service (SMS) message service, Multimedia Message Service (MMS) message service, Internet access, cloud computing, and/or other types of data services. Radio access network 120 may include base stations 125-A to 125-N (referred to herein collectively as "base stations 125" and individually as "base station 125"). Each base station 125 may service a set of UE devices 110. For example, base station 125-A may service UE devices 110-AA to 110-AX, etc., and base station 125-N, which may service UE devices 110-NA to 110-NY. In other words, UE devices 110-AA to 110-AX may be located within the geographic area serviced by base station 125-A, and other UE devices 110 may be serviced by another base station 125.

Base station 125 may include a 5G base station (e.g., a next generation NodeB (gNodeB)) that includes one or more radio frequency (RF) transceivers (also referred to as "cells" and/or "base station sectors") facing particular directions. For example, base station 125 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UE devices 110, and may simultaneously generate up to k antenna beams. A particular antenna beam may service multiple UE devices 110. In some implementations, base station 125 may also include a 4G base station (e.g., an extended NodeB (eNodeB)). Furthermore, in some implementations, base station 125 may include a mobile edge computing (MEC) system that performs cloud computing and/or network processing services for UE devices 110.

Core network 130 may manage communication sessions for UE devices 110. For example, core network 130 may establish an Internet Protocol (IP) connection between UE device 110 and a particular data network 140. Furthermore, core network 130 may enable UE device 110 to communicate with an application server, and/or another type of device, located in a particular data network 140 using a communication method that does not require the establishment of an IP connection between UE device 110 and data network 140, such as, for example, Data over Non-Access Stratum (DoNAS).

In some implementations, core network 130 may include a Long Term Evolution (LTE) access network (e.g., an evolved packet core (EPC) network). In other implementations, core network 130 may include a Code Division Multiple Access (CDMA) access network. For example, the CDMA access network may include a CDMA enhanced High Rate Packet Data (eHRPD) network (which may provide access to an LTE access network).

Furthermore, core network 130 may include an LTE Advanced (LTE-A) access network and/or a 5G core network or other advanced network that includes functionality such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Data networks 140-A to 140-N (referred to herein collectively as "data networks 140" and individually as "data network 140") may each include a packet data network. A particular data network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 140 may be managed by a communication services provider that also manages core network 130, radio access network 120, and/or particular UE devices 110. For example, in some implementations, a particular data network 140 may include an IP Multimedia Sub-system (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
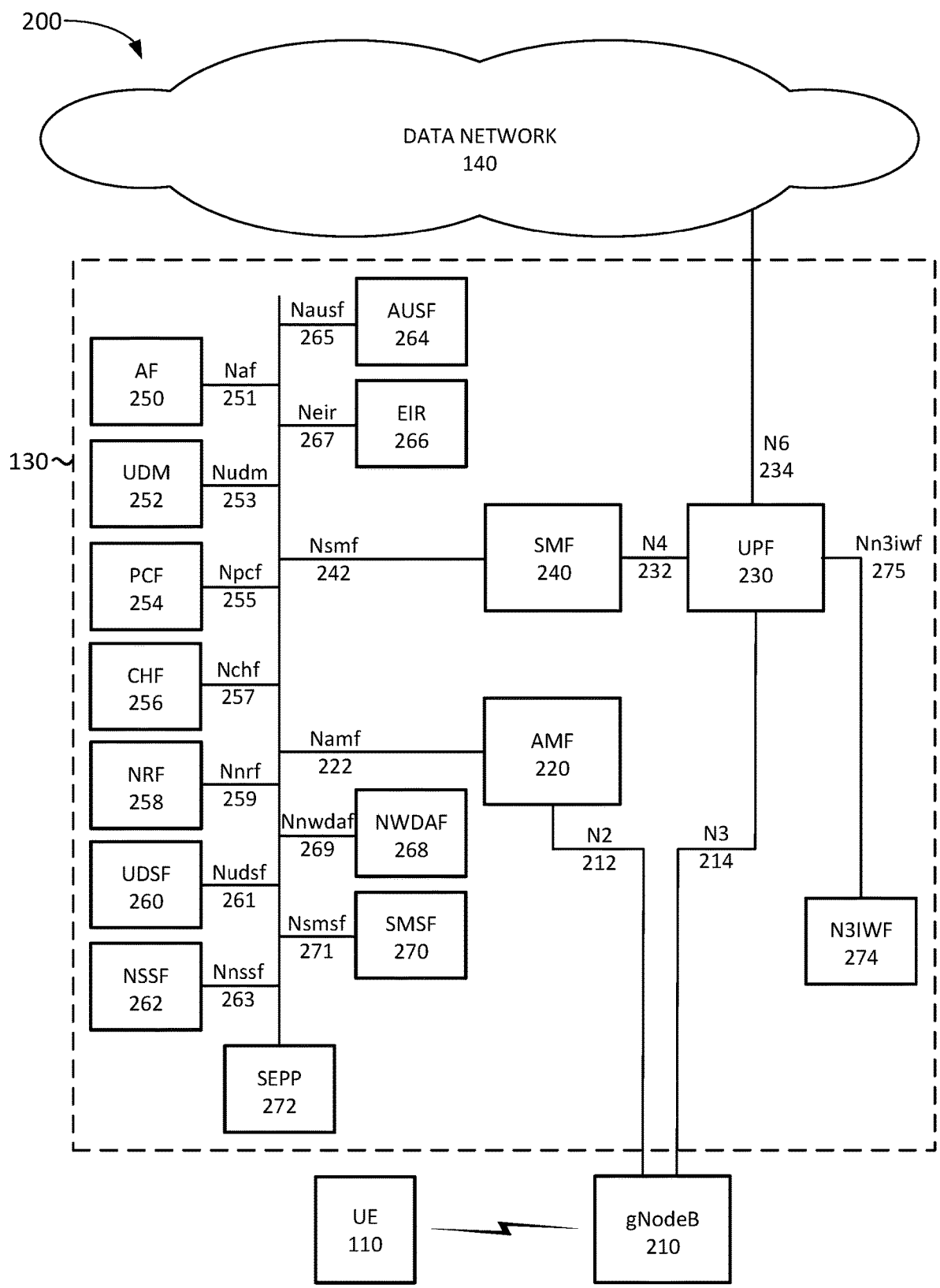
FIG. 2 is a diagram illustrating exemplary components of the core network of FIG. 1 according to an implementation described herein.

FIG. 2 is a diagram illustrating a system 200 that includes exemplary components of core network 130 in the context of environment 100 according to an implementation described herein. As shown in FIG. 2, system 200 may include UE device 110, gNodeB 210, core network 130, and data network 140.

gNodeB 210 (corresponding to base station 125) may include one or more devices (e.g., base stations) and other components and functionality that enable UE device 110 to wirelessly connect to access network 120 using 5G NR Radio Access Technology (RAT). For example, gNodeB 210 may service one or more cells, with each cell being served by a wireless transceiver with an antenna array configured for mm-wave wireless communication. gNodeB 210 may communicate with AMF 220 using an N2 interface 212 and communicate with UPF 230 using an N3 interface 214.

Core network 130 may include an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Charging Function (CHF) 256, a Network Repository Function (NRF) 258, an Unstructured Data Storage Network Function (UDSF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, AF 250, UDM 252, PCF 254, CHF 256, NRF 258, UDSF 260, NSSF 262, AUSF 264, EIR 266, NWDAF 268, SMSF 270, SEPP 272, and N3IWF 274 for illustration purposes, in practice, core network 130 may include multiple AMFs 220, UPFs 230, SMFs 240, AFs 250, UDMs 252, PCFs 254, CHFs 256, NRFs 258, UDSFs 260, NSSFs 262, AUSFs 264, EIRs 266, NWDAFs 268, SMSFs 270, SEPPs 272, and/or N3IWFs 274.

The components depicted in FIG. 2 may be implemented as dedicated hardware components or as virtualized functions implemented on top of a common shared physical infrastructure using SDN. For example, an SDN controller may implement one or more of the components of FIG. 2 using an adapter implementing a VNF virtual machine, a cloud-native network function (CNF) container, an event driven serverless architecture interface, and/or another type of SDN architecture. The common shared physical infrastructure may be implemented using one or more devices 300 described below with reference to FIG. 3 in a cloud computing center associated with core network 130. Additionally, or alternatively, some, or all, of the common shared physical infrastructure may be implemented using one or more devices 300 described below with reference to FIG. 3 using a MEC system associated with base stations 125.

AMF 220 may perform registration management, connection management, reachability management, mobility management, lawful intercepts, Short Message Service (SMS) transport between UE device 110 and an SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-radio access technology (RAT) mobility, maintain an external Packet Data Unit (PDU) point of interconnect to a particular data network 140, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a Radio Access Network node (e.g., gNodeB 210), and/or perform other types of user plane processes. UPF 230 may communicate with SMF 240 using an N4 interface 232 and connect to data network 140 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for interacting with a policy framework for policy control, and/or other types of applications. AF 250 may be accessible via an Naf interface 251.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 130. CHF 256 may be accessible via Nchf interface 257.

NRF 258 may support a service discovery function and maintain profiles of available network function (NF) devices/instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 258 may include one or more transport network key performance indicators (KPIs) associated with the NF device/instance. NRF 258 may be accessible via an Nnrf interface 259.

UDSF 260 may store unstructured data for other NFs, including third party NFs, AFs, edge computing NFs, and/or other types of NFs. For example, UDSF 260 may store tables accessible by NRF 258 for determining NFs available to UEs 110. UDSF 260 may be accessible via Nudsf interface 261.

NSSF 262 may select a set of network slice instances to serve a particular UE device 110, determine network slice selection assistance information (NSSAI), determine a particular AMF 220 to serve a particular UE device 110, and/or perform other types of processing associated with network slice selection or management. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via Neir interface 267.

NWDAF 268 may collect analytics information associated with radio access network 120 and/or core network 130. For example, NWDAF 268 may collect accessibility KPIs (e.g., an radio resource control (RRC) setup success rate, a radio access bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi access point (not shown in FIG. 2). N3IWF 274 may facilitate handovers for UE device 110 between radio access network 120 and the non-3GPP access device. N3IWF 274 may be accessible via Nn3iwf interface 275.

Although FIG. 2 shows exemplary components core network 130, in other implementations, core network 130 may include fewer components, different components, differently arranged components, or additional components than depicted in FIG. 2. Additionally or alternatively, one or more components of core network 130 may perform functions described as being performed by one or more other components of core network 130. For example, core network 130 may include additional function nodes not shown in FIG. 2, such as a Unified Data Repository (UDR), a Location Management Function (LMF), a Lawful Intercept Function (LIF), a binding session function (BSF), and/or other types of functions. Furthermore, while particular interfaces have been described with respect to particular function nodes in FIG. 2, additionally, or alternatively, core network 130 may include a reference point architecture that includes point-to-point interfaces between particular function nodes.

Figure 3:
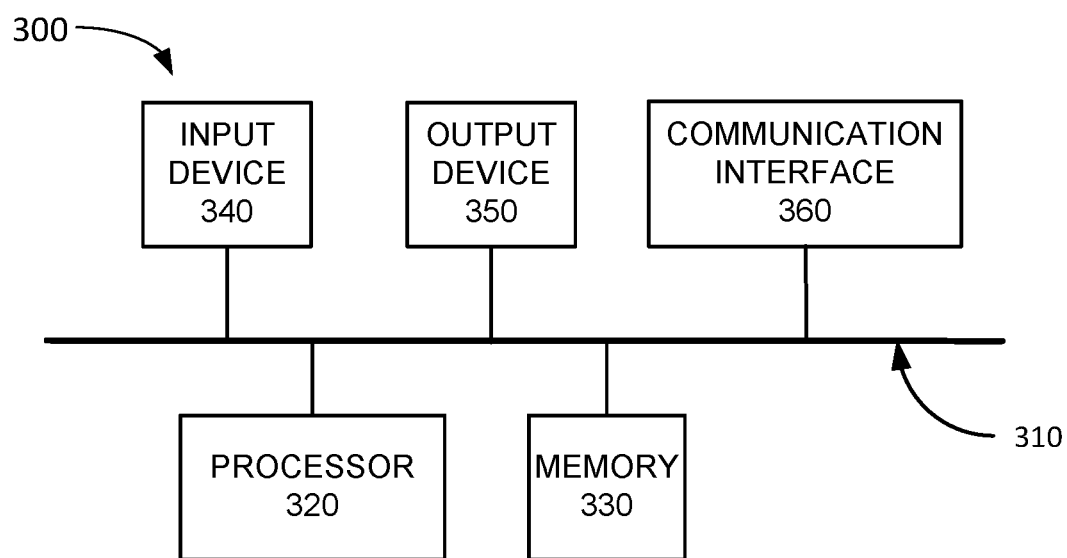
FIG. 3 is a diagram illustrating exemplary components of a device that may be included in a component of FIG. 1 or FIG. 2 according to an implementation described herein.

FIG. 3 is a diagram illustrating example components of a device 300 according to an implementation described herein. UE device 110, gNodeB 210, AMF 220, UPF 230, SMF 240, AF 250, UDM 252, PCF 254, CHF 256, NRF 258, UDSF 260, NSSF 262, AUSF 264, EIR 266, NWDAF 268, SMSF 270, SEPP 272, N3IWF 274, and/or other components of core network 130, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to determining an application specific location and discovering network functions corresponding to the application specific location. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
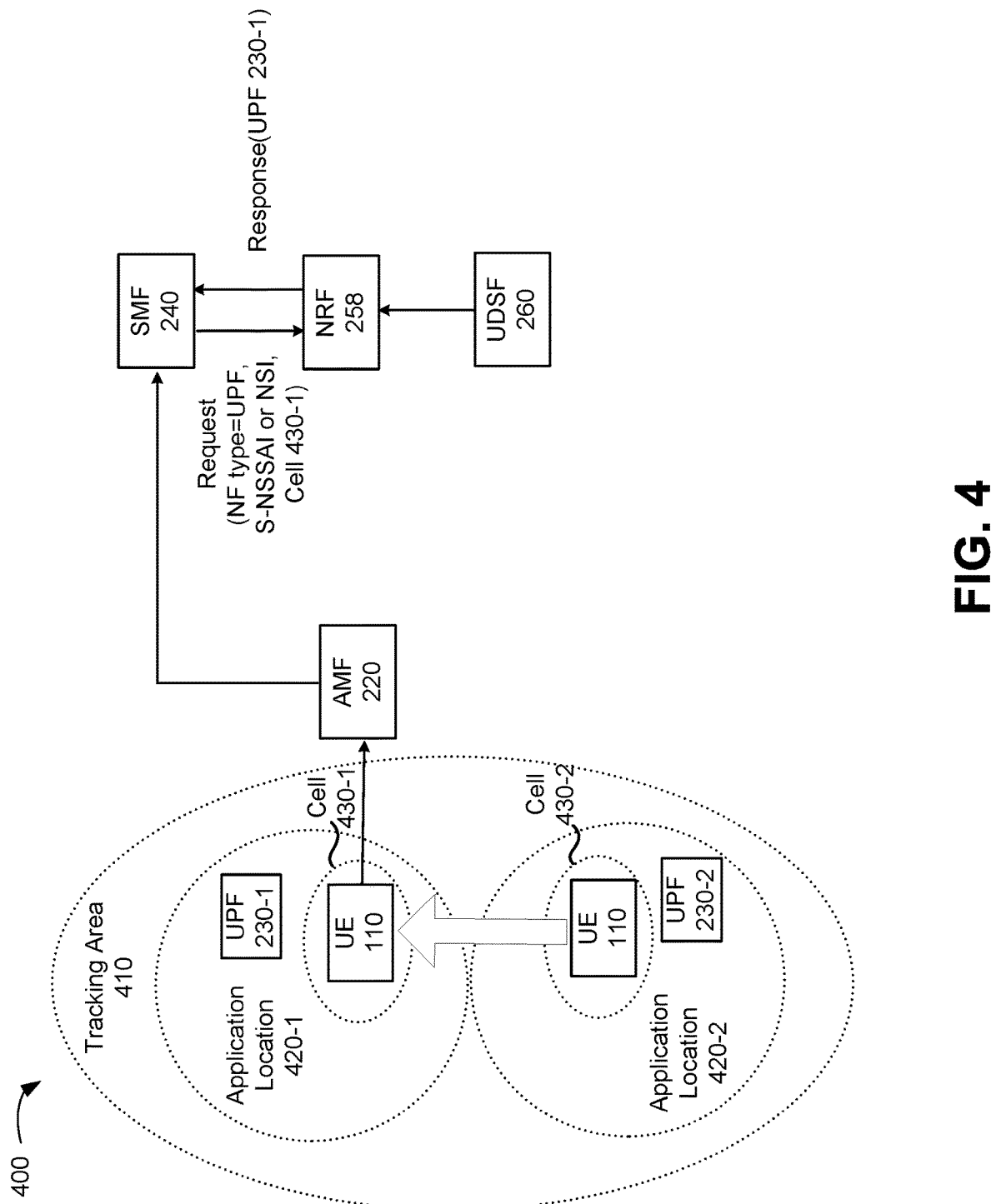
FIG. 4 is a diagram illustrating an exemplary environment for determining network functions according to an implementation described herein.

FIG. 4 is a diagram of an exemplary environment 400 in which the systems and/or methods, described herein, may be implemented. As shown in FIG. 4, environment 400 may include tracking area 410, application locations 420-1 and 420-2, cells 430-1 and 430-2, UPFs 230-1 and 230-2, UE 110, AMF 220, SMF 240, NRF 258, and UDSF 260.

As shown in FIG. 4, tracking area 410 may encompass two application locations—application location 420-1 and application location 420-2. When UE 110 moves from cell 430-2 to cell 430-1, as shown in FIG. 4, the network may not realize that more appropriate network functions exist for UE 110 once UE 110 has moved to cell 430-1. For example, if UE 110 is running an application that accesses a low latency MEC network, the coverage area of the MEC site may not be best defined by tracking area 410. Since UE 110 has moved within tracking area 410, the system may not be able to determine which UPF would best serve UE 110 since both UPF 230-1 and UPF 230-2 are within the same tracking area 410. Therefore, the coverage area of the MEC site may best be defined using application location 420-1 and application location 420-2 since different UPFs serve each application location.

In the example shown in FIG. 4, the location of UE 110 may best be mapped to a cell ID instead of a TAI. As shown in FIG. 4, when UE 110 moves from cell 430-2 to cell 430-1, UE 110 executing the MEC application may additionally move from application location 420-2 to application location 420-1. Since UPF 230-1 is associated with application location 420-1 and UPF 230-2 is associated with application location 420-2, the system may be able to determine which UPF is appropriate for UE 110 based on the cell location of UE 110. In the example shown in FIG. 4, when UE 110 moves from cell 430-2 to cell 430-1, the system may determine that the most suitable UPF for serving UE 110 in cell 430-1 is UPF 230-1.

In order to determine which network functions are best suited for UE 110 at the new location, AMF 220 may determine an identifier associated with the new location of UE 110 and AMF 220 may forward the identifier to SMF 240. SMF 240 may transmit a discovery request to NRF 258 that includes the identifier associated with the new location. The discovery request may indicate whether the location is per S-NSSAI or per network slice instance (NSI) and may indicate the cell ID or TAI associated with the new location. For example, as shown in FIG. 4, the discovery request may indicate that the new location is cell 430-1. In addition, the discovery request may indicate a type of network function requested. In the example shown in FIG. 4, the discovery request may indicate that the NF type is UPF. Therefore, in the example shown in FIG. 4, SMF 240 may send a request to NRF 258 to determine the most appropriate UPF for serving UE 110 at location cell 430-1.

As described below with regard to FIG. 5, NRF 258 may use the new location as an input to look up available UPFs in one or more tables. For example, NRF 258 may use a first table (not shown) to look up an application location identifier corresponding to the cell ID of cell 430-1. NRF 258 may additionally use the application location identifier retrieved from the first table to determine available network functions and UPFs associated with the network functions for UE 110 in application location 420-1. In the example of FIG. 4, based on the information in the discovery request, NRF 258 may determine that UPF 230-1 is the most suitable UPF for UE 110 when UE 110 moves to cell 430-1. NRF 258 may forward the results of the table lookups to SMF 240. For example, as shown in FIG. 4, NRF 258 may forward a discovery response to SMF 240 that indicates that UPF 230-1 is the most appropriate UPF to serve UE 110 in cell 430-1.

FIG. 5 illustrates exemplary tables A, B, C, and D for determining network functions available to UE 110 based on UE 110 location. The tables illustrated in FIG. 5 may be maintained in UDSF 260 for example. As shown in FIG. 5, Tables A and B may maintain a mapping between physical RAN location and application location. Tables C and D may provide a mapping between application location ID and NF instance ID (i.e., an NF instance created for the application) for an S-NSSAI (Table C) or a Network Slice Instance (NSI) (Table D). Application location IDs and NF Instance IDs may only need to be unique per S-NSSAI or per NSI.

An application may define its locations based on cell IDs or TAI on a per use case (e.g., based on S-NSSAI). Table A may provide a mapping between a cell ID and an application location ID. As shown in FIG. 5, Table A may include an S-NSSAI column 510, a Cell ID column 512, and an Application Location ID column 514. As shown in Table A, slice ID S1 in column 510 may be associated with cell IDs C1, C2, C3, C4, C5, and C6 of column 512. As shown in column 514, application location ID A1 may be associated with cell IDs C1, C2, and C3 and application ID A2 may be associated with cell IDs C4, C5, and C6. As further shown in Table A, application location ID A3 may be associated with cell IDs C1, C2, C3, C5, and C6 of slice S2.

Table B may provide a mapping between TAI and application location ID. As shown in FIG. 5, Table B may include an S-NSSAI column 516, a TAI column 518, and an Application Location ID column 520. As shown in column 518 of Table B, slice ID S1 may include tracking areas T1 and T2. Turning to column 520, application location A4 may be mapped to tracking area T1 of slice S1 and application location A5 may be mapped to tracking area T2 of slice S1. As further shown in Table B, application location A6 may be mapped to tracking areas T3 and T4 of slice S2.

After determining the application location ID from Table A or Table B, the network functions available to a UE in the application location may be determined from Tables C and D of FIG. 5. Tables C and D may be configured for statically or manually created NF instances, maintained at run-time (e.g., updated by NF instances upon being created), or both.

Table C may provide a mapping between network functions and application location IDs per S-NSSAI. As shown in FIG. 5, Table C may include S-NSSAI column 522, Application Location ID column 524, and NF instance ID column 526. Column 526 may indicate that network functions N1, N2, and N3 are available in application location A1 of slice S1. In addition, network functions N10 and N20 may be available in application location A2 of slice S1. Network functions N31, N32, and N33 may be available in application location A5 of slice S2.

Table D may provide a mapping between network functions and application location IDs per NSI. As shown in FIG. 5, Table D may include an NSI ID column 528, an Application Location ID column 530, and an NF instance ID column 532. As shown in columns 528 and 530 of Table D, NSI NS1 may include application locations A1 and A2. As shown in column 532, network functions N1, N2, and N3 may be available in application location A1 for NSI ID NS1 and network functions N10 and N20 may be available in application location A2 for NSI ID NS1. As further shown in Table D, network functions N31, N32, and N33 may be available in application location A5 of NSI ID NS2.

Although Tables A-D are shown as separate tables, the information contained in Tables A-D may be implemented as portions of a single table or more than one table in other implementations.

Figure 6:
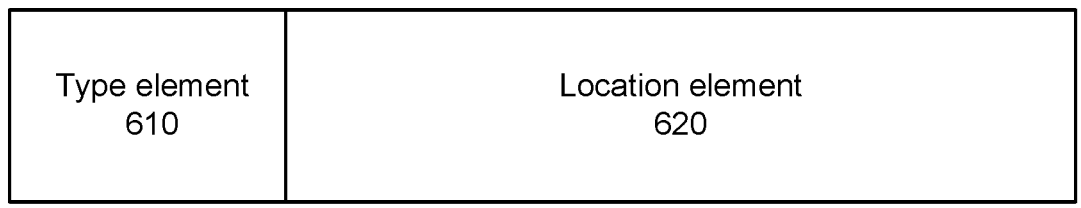
FIG. 6 is a diagram illustrating an exemplary format for application specific location information according to an implementation described herein.

FIG. 6 illustrates an exemplary format 600 for application specific location information. Format 600 may include a type element 610 and a location element 620. Type element 610 may specify the type and format of the location element. Type element 610 may include Cell ID or Application Specific. When type element 610 is Cell ID, location element 620 may be the 3GPP-defined cell ID. When type element 610 is Application Specific, location element 620 may use a scheme defined by a network operator or service provider. For example, the operator-defined scheme may include numerical values associated with one or more cell IDs or one or more TAIs.

Figure 7:
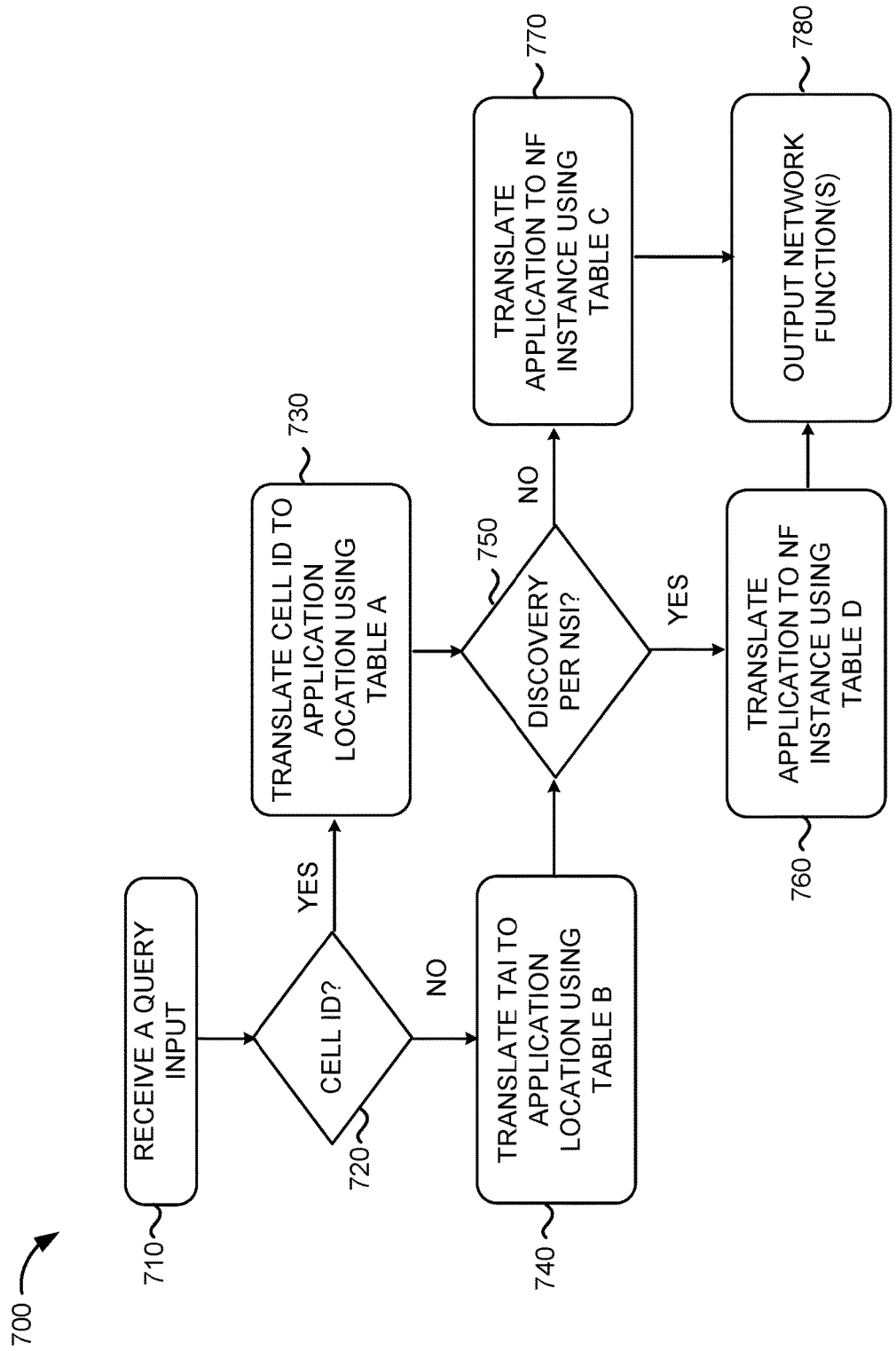
FIG. 7 is a flowchart of an exemplary process for identifying a table to locate network functions according to an implementation described herein.

FIG. 7 is a flowchart of a process 700 for identifying which table illustrated in FIG. 5 to use to locate network functions to serve a UE based on UE location. When trying to discover an NF instance to serve the UE based on the UE location, the cell ID and/or TAI currently associated with the UE may be used for UE location. When the cell ID is provided, the application specific location information format discussed with regard to FIG. 6 may be used and type element 610 may be set to Cell ID.

Process 700 may begin by receiving a query input (block 710). For example, NRF 258 may receive a query input that includes a location of UE 110. In one implementation, the location of UE 110 may include a cell ID, such as cell 430-1, as described above with regard to FIG. 4. In another implementation, the location of UE 110 may include a TAI.

Process 700 may continue by determining whether the query input includes a cell ID (block 720). If the query input includes a cell ID (block 720—yes), the cell ID may be translated to an application location using Table A of FIG. 5 (block 730). For example, NRF 258 may receive the location information of UE 110 from SMF 240 and may access Table A in UDSF 260 to determine an application location associated with the cell containing UE 110. If the query input does not include a cell ID (block 720—no), the TAI of UE 110 may be translated to the application information using Table B of FIG. 5 (block 740). For example, NRF 258 may receive the location of UE 110 from SMF 240 and may determine that the location is based on a tracking area instead of a cell. In this example, NEF 258 may access Table B in UDSF 260 to determine the application location associated with the TAI.

Process 700 may continue by determining whether the discovery request is per NSI (block 750). For example, the discovery request may be a request for an NF instance within an NSI or for an S-NSSAI. If the discovery request is per NSI (block 750—yes), the application location may be translated to an NF instance using Table D of FIG. 5 (block 760). For example, the network functions available for the application location determined in block 730 or 740 may be determined using Table D when the request is per NSI. If the discovery request is not per NSI (block 750—no), the application location may be translated to an NF instance using Table C of FIG. 5 (block 770). For example, if the discovery request is not per NSI, then the discovery request may be per S-NSSAI. In this example, Table C may be used to determine the network functions available to UE 110 in the application location determined in block 730 or 740.

Process 700 may continue by outputting the network functions determined in block 760 or 770 (block 780). For example, the network functions available to serve UE 110 based on UE location may be outputted to NRF 258. In this way, UE 110 may determine the best network functions available to UE 110 based on the UE location.

Figure 8:
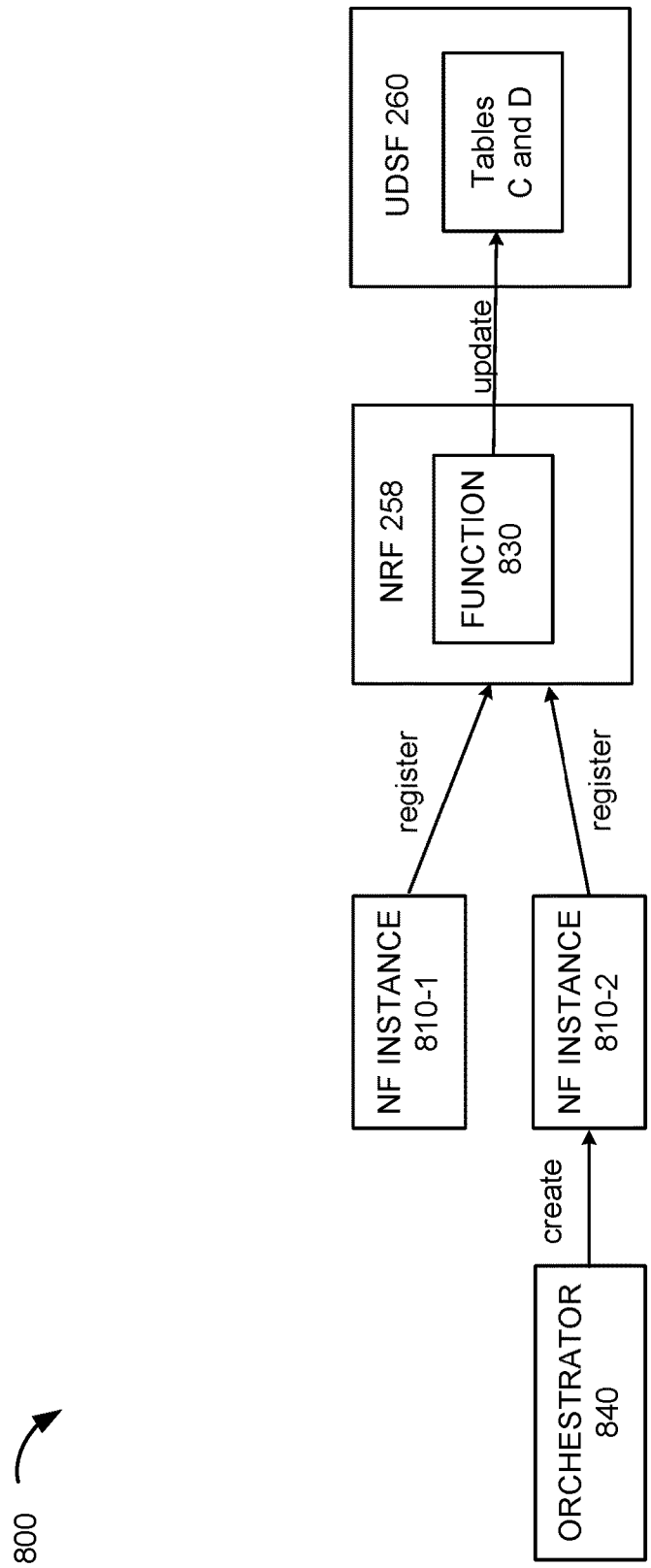
FIG. 8 is a diagram of an exemplary environment for registering network functions according to an implementation described herein.

FIG. 8 illustrates a diagram of an environment 800 for registering NF instances and updating Tables B and C based on the registration information. Environment 800 may include NF instances 810-1 and 820-2 (referred to herein collectively as "NF instances 810" and individually as "NF instance 810"), function 830 within NRF 258, Tables C and D within UDSF 260, and orchestrator 840.

For every NF instance 810 that is created for a slice or an NSI, the NF instance 810 may have store information identifying a location ID or determine a location ID that is specific for the application and slice or NSI for which the NF instance 810 was created. The location ID may be part of an onboarding package description associated with new NF instance 810, part of instance specific configuration information for NF instance 810, or dynamically conveyed to NF instance 810 via orchestrator 840.

When NF instance 810 is created, NF instance 810 may register with a function. For example, as shown in FIG. 8, NF instance 810 may register with function 830 within NRF 258. When NF instance 810 registers with function 830, NF instance 810 may register using configuration information. Alternatively, as shown in FIG. 8, orchestrator 840 may provide the configuration information to function 830. The configuration information may include the application specific location associated with NF instance 810. For example, the application specific location may be in format 600 with type element 610 set to Application Specific. In addition, the configuration information may include S-NSSAI and/or NSI ID for which NF instance 810 is created.

As further shown in FIG. 8, after NF instance 810 registers with function 830, function 830 may update the tables in FIG. 5 based on the configuration information. For example, function 830 may update Tables C and D based on the S-NSSAI or NSI ID and the application location. In this way, UE 110 may be able to access NF instance 810 when UE 110 is in the application location associated NF instance 810 by using the tables in FIG. 5 to lookup NF instance 810.

In another implementation, when registering, NF instance 810 may provide a collection of location information instead of providing the application specific location. For example, NF instance 810 may provide to function 830 a collection of cell IDs that make up an application specific location. In this case, the application specific information may include more than one location with type element 610 set to Cell ID. In this example, entries corresponding to NF instance 810 in Tables C and D may include a collection of location information instead of a single application specific location.

Figure 9:
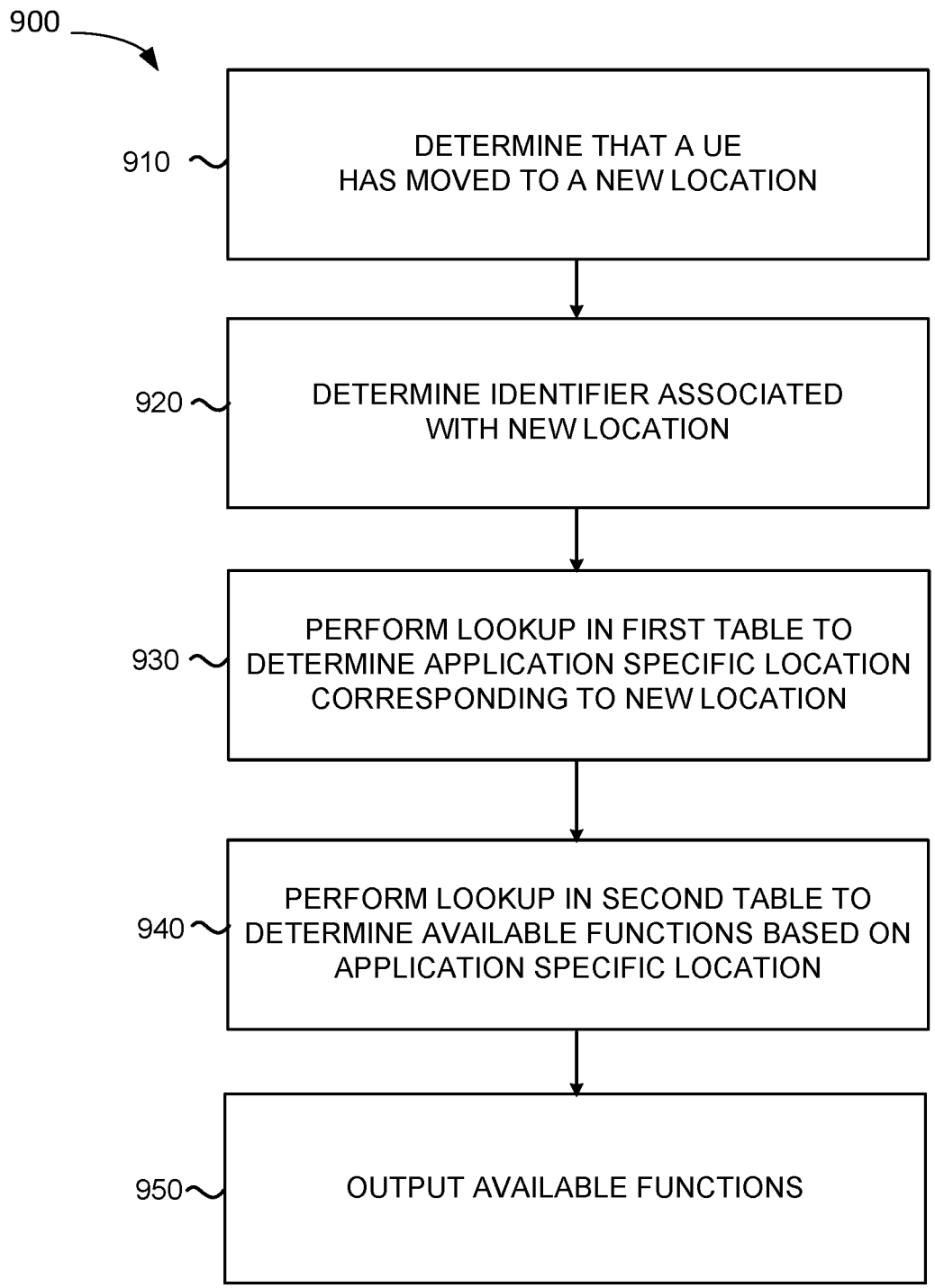
FIG. 9 is a flowchart of an exemplary process for determining network functions according to an implementation described herein.

FIG. 9 is a flowchart of a process 900 for determining functions available to UE 110 when UE 110 changes its location. Process 900 may begin by determining that UE 110 has moved to a new location (block 910). For example, UE 110 may move from cell 430-2 to cell 430-1. In another implementation, UE 110 may move from a first tracking area to a second tracking area. Process 900 may continue by determining an identifier associated with the new location (block 920). For example, an identifier associated with the new location may be cell C1 within slice S1. In another example, the identifier associated with the new location may be tracking area T1 within slice S1.

Process 900 may continue by performing a lookup in a first table to determine an application specific location corresponding to the new location (block 930). For example, AMF 220 may receive the identifier associated with the new location and may pass the identifier to SMF 240. SMF 240 may transmit a discovery request to NRF 258. The discovery request may include a slice ID or slice instance associated with the new location and a cell or tracking area associated with the new location. For example, the discovery request may indicate that the new location is cell C1 within slice S1. In another example, the discovery request may indicate that the new location is tracking area T1 within slice S1. Additionally, the discovery request may indicate a type of network function. For example, the discovery request may indicate that the NF type is UPF.

NRF 258 may perform a lookup in Table A or Table B in UDSF 260 based on the information in the discovery request to determine an application specific location corresponding to the new location of UE 110. For example, if the discovery request indicates that the new location is cell C1 within slice S1, NRF 258 may perform a lookup in Table A to determine that the application specific location identifier is A1. In another example, if the discovery request indicates that the new location is tracking area T1 within slice S1, NRF 258 may perform a lookup in Table B to determine that the new location corresponds to application specific location identifier A4.

Process 900 may continue by performing a lookup in a second table to determine available functions associated with the application specific location (block 940). For example, once the application specific location identifier has been determined from Table A or Table B, NRF 258 may perform a lookup in Table B or Table C to determine network functions available in the application specific location. When the NF type is UPF, the NF Instance ID may indicate the most appropriate UPF for the new location.

In one implementation, if the new location of UE 110 is per slice, NRF 258 may perform a lookup in Table C to determine NF instances associated with the application specific location. For example, if the new location is application specific location ID A1 within slice S1, NRF 258 may perform a lookup in Table C to determine that network functions N1, N2, and N3 are available to UE 110 in the new location.

In another implementation, if discovery is per NSI, NRF 258 may perform a lookup in Table D to determine NF instances associated with the application specific location. For example, if the new location is application specific location ID A1 and the NSI ID is SN1, NRF 258 may perform a lookup in Table D to determine that network functions N1, N2, and N3 are available to UE 110 in the new location.

Process 900 may continue by outputting an indication of network functions (block 950). For example, NRF 258 may forward a discovery response that includes available network functions for the new location. In one implementation, the discovery response may include an indication of the best UPF to serve UE 110 based on the new location. In this way, UE 110 may utilize the most appropriate NF instance to handle a PDU session based on an application being executed on UE 110.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signals with respect to FIG. 9, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, in response to a user device that is executing an application having moved from a previous location to a location, an identifier associated with the location of the user device, slice information associated with the location, and an indication of a type of network function requested by the application being executed by the user device;
    performing a first lookup using the identifier and the slice information associated with the location to determine an application specific location associated with the application being executed by the user device;
    performing a second lookup using the slice information and the application specific location to determine one or more network functions matching the type of the network function requested by the application that are available in the application specific location; and
    outputting, to the user device, an indication of the one or more network functions.

2. The method of claim 1, wherein the identifier includes a cell identifier.

3. The method of claim 1, wherein the identifier includes a tracking area identifier.

4. The method of claim 1, wherein performing the first lookup comprises:
    receiving a request to perform the first lookup, wherein the request includes the identifier, a slice identifier or a slice instance associated with the location, and the type of the network function requested by the application; and
    performing the first lookup based on the request.

5. The method of claim 1, wherein performing the first lookup includes:
    performing the first lookup in a first table when the identifier includes a cell identifier; and
    performing the first lookup in a second table when the identifier includes a tracking area identifier.

6. The method of claim 1, further comprising:
    registering the one or more network functions when the one or more network functions are created, wherein registering the one or more network functions includes registering the application specific location associated with the one or more network functions.

7. The method of claim 6, wherein registering the one or more network functions includes:
    storing identifiers associated with the one or more network functions and the application specific location associated with the one or more network functions.

8. A system comprising:
    one or more processors to:
        receive, in response to a user device that is executing an application having moved from a previous location to a location, an identifier associated with the location of the user device, slice information associated with the location, and an indication of a type of network function requested by the application being executed by the user device;
        perform a first lookup in a table using the identifier and the slice information associated with the location to determine an application specific location associated with the application being executed by the user device;
        perform a second lookup in a second table using the slice information and the application specific location to determine one or more network functions matching the type of the network function requested by the application that are available in the application specific location; and
        output, to the user device, an indication of the one or more network functions.

9. The system of claim 8, wherein the identifier includes a cell identifier.

10. The system of claim 8, wherein the identifier includes a tracking area identifier.

11. The system of claim 8, wherein, when executing the instructions to perform the first lookup, the one or more processors are further configured to execute the instructions to:
    receive a request to perform the first lookup, wherein the request includes the identifier, a slice ID or a slice instance associated with the location, and the type of the network function requested by the application being executed by the user device; and perform the first lookup based on the request.

12. The system of claim 8, wherein, when executing the instructions to perform the first lookup, the one or more processors are further configured to execute the instructions to:

perform the first lookup in a third table when the identifier includes a cell identifier; and perform the first lookup in a fourth table when the identifier includes a tracking area identifier.

13. The system of claim 8, wherein the one or more processors are further configured to execute the instructions to:

register the one or more network functions when the one or more network functions are created, wherein registering the one or more network functions includes registering the application specific location associated with the one or more network functions.

14. The system of claim 13, wherein, when executing the instructions to register the one or more network functions, the one or more processors are further configured to execute the instructions to:

store identifiers associated with the one or more network functions and the application specific location associated with the one or more network functions in the second table.

15. A non-transitory computer-readable memory device that stores instructions, the instructions comprising:

one or more instructions that, when executed by one or more processors, cause the one or more processors to:

receive, in response to a user device that is executing an application having moved from a previous location to a location, an identifier associated with the location of the user device, slice information associated with the location, and an indication of a type of network function requested by the application being executed by the user device;

perform a first lookup in a table using the identifier and the slice information associated with the location to determine an application specific location associated with the application being executed by the user device;

perform a second lookup in a second table using the slice information and the application specific location to determine one or more network functions matching the type of the network function requested by the application that are available in the application specific location; and output, to the user device, an indication of the one or more network functions.

16. The computer-readable memory device of claim 15, wherein the identifier includes a cell identifier.

17. The computer-readable memory device of claim 15, wherein the identifier includes a tracking area identifier.

18. The computer-readable memory device of claim 15, wherein the one or more instructions that cause the one or more processors to perform the first lookup comprise one or more instructions that cause the one or more processors to:

receive a request to perform the first lookup, wherein the request includes the identifier, a slice ID or a slice instance associated with the new location, and the type of the network function requested by the application; and perform the first lookup based on the request.

19. The computer-readable memory device of claim 15, wherein the one or more instructions that cause the one or more processors to perform the first lookup comprise one or more instructions that cause the one or more processors to:

perform the first lookup in a third table when the first identifier includes a cell identifier; and perform the first lookup in a fourth table when the first identifier includes a tracking area identifier.

20. The computer-readable memory device of claim 15, wherein one or more instructions further cause the one or more processors to:

register the one or more network functions when the one or more network functions are created, wherein registering the one or more network functions includes storing identifiers associated with the one or more network functions and the application specific location associated with the one or more network functions in the second table.

\* \* \* \* \*